(12) United States Patent
Masaoka (10) Patent No.: US 8,205,221 B2
(45) Date of Patent: Jun. 19, 2012

(54) SLOT-IN TYPE DISK APPARATUS HAVING LINK ARM WITH FOLDED PIECE

(75) Inventor: Kengo Masaoka, Ehime (JP)

(73) Assignee: Panasonic Corporation, Osaka (JP)

( * ) Notice: Subject to any disclaimer, the term of this patent is extended or adjusted under 35 U.S.C. 154(b) by 831 days.

(21) Appl. No.: 12/162,222

(22) PCT Filed: Jan. 19, 2007

(86) PCT No.: PCT/JP2007/050828
§ 371 (c)(1),
(2), (4) Date: Nov. 3, 2008

(87) PCT Pub. No.: WO2007/088742
PCT Pub. Date: Aug. 9, 2007

(65) Prior Publication Data
US 2009/0044209 A1    Feb. 12, 2009

(30) Foreign Application Priority Data
Jan. 31, 2006   (JP) ................................ 2006-023404

(51) Int. Cl.
*G11B 33/12*    (2006.01)
*G11B 17/04*    (2006.01)

(52) U.S. Cl. ........................ 720/652; 720/620

(58) Field of Classification Search ............... 720/652, 720/619, 620, 622, 623, 632, 641, 654
See application file for complete search history.

(56) References Cited

U.S. PATENT DOCUMENTS

| 5,495,467 A | 2/1996 | Tanaka |
| 5,623,381 A | 4/1997 | Sawada |
| 2002/0159373 A1* | 10/2002 | Saji et al. ................... 369/77.1 |
| 2008/0148301 A1 | 6/2008 | Masaoka |

FOREIGN PATENT DOCUMENTS

| JP | 5-325371 | 12/1993 |
| JP | 2002-352498 | 12/2002 |
| JP | 2005-327431 | 11/2005 |

OTHER PUBLICATIONS

Japanese Office Action dated Mar. 3, 2009 with English translation.
International Search Report dated Feb. 20, 2007.

* cited by examiner

*Primary Examiner* — Craig A. Renner
*Assistant Examiner* — Gustavo Polo
(74) *Attorney, Agent, or Firm* — Dickinson Wright PLLC

(57) ABSTRACT

A slot-in type disk apparatus in which a base body and a lid constitute a chassis sheath, a disk-insertion opening is formed in a front surface of the chassis sheath, a traverse base is disposed on a front surface side of the base body, a rear base is disposed on a rear surface side of the base body, a printed board is provided between the rear base and the base body, and a link arm is disposed between the rear base and the printed board, wherein an opening is formed in a portion of the rear base, a folded piece which is folded toward the opening is formed on a portion of the link arm, a space is formed on the side of the printed board by the folded piece, and a part to be mounted on the printed board is disposed such as to correspond to the space.

2 Claims, 8 Drawing Sheets

SLOT-IN TYPE DISK APPARATUS HAVING LINK ARM WITH FOLDED PIECE

TECHNICAL FIELD

The present invention relates to a disk apparatus for recording or replaying into or from a disk-like recording medium such as a CD and a DVD, and more particularly, to a slot-in type disk apparatus into which and from which a disk can directly be inserted or discharged.

BACKGROUND TECHNIQUE

According to a conventional disk apparatus, there is widely employed a loading system in which a disk is placed on a tray or a turntable, and the tray or the turntable is loaded into an apparatus body. According to such a loading system, since the tray or the turntable is required, there is a limit to reduce the thickness of the disk apparatus body. Therefore, there recently exists a slot-in type disk apparatus in which a disk is directly operated by a lever or the like using a loading motor (e.g., patent document 1).
[Patent Document 1] Japanese Patent Application Laid-open No. 2002-352498

DISCLOSURE OF THE INVENTION

Problem to be Solved by the Invention

Even if the disk apparatus is of the slot-in type in which a disk is directly operated by a lever or the like, in order to further reduce the apparatus in thickness, it is necessary to reduce the plate thickness of the lever or a base body, but if the plate thickness is reduced, sufficient strength can not be obtained.

Hence, it is an object of the present invention to provide a slot-in type disk apparatus which can be reduced in thickness without deteriorating strength of a lever or a base body.

Means for Solving the Problem

A first aspect of the present invention provides a slot-in type disk apparatus in which a base body and a lid constitute a chassis sheath, a disk-insertion opening into which a disk is directly inserted is formed in a front surface of the chassis sheath, a traverse base is disposed on a front surface side of the base body, a rear base is disposed on a rear surface side of the base body, a printed board is provided between the rear base and the base body, and a link arm is disposed between the rear base and the printed board, wherein an opening is formed in a portion of the rear base, a folded piece which is folded toward the opening is formed on a portion of the link arm, a space is formed on the side of the printed board by the folded piece, and a part to be mounted on the printed board is disposed such as to correspond to the space.

According to a second aspect of the invention, in the slot-in type disk apparatus of the first aspect, the opening is located in a moving range of a lever where the disk is inserted or discharged, and the lever moves above the folded piece.

Effect of the Invention

According to the present invention, a plate thickness of the lever can sufficiently be secured, and a space in which the part is disposed is secured by the space formed by the folded piece. With this, the thickness of the apparatus can be reduced.

EXPLANATION OF SYMBOLS

10 base body
11 disk-insertion opening
13 rear base
13A opening
14 printed board
14A part
105 link arm
105D folded piece

BEST MODE FOR CARRYING OUT THE INVENTION

According to the slot-in type disk apparatus of the first aspect of the invention, an opening is formed in a portion of the rear base, a folded piece which is folded toward the opening is formed on a portion of the link arm, a space is formed on the side of the printed board by the folded piece, and a part to be mounted on the printed board is disposed such as to correspond to the space. With this aspect, the thickness of the rear base is sufficiently secured, a gap in which the part is disposed is secured by the space formed by the folded piece, and the thickness of the apparatus can be reduced.

According to the second embodiment, in the slot-in type disk apparatus of the first aspect, the opening is located in a moving range of a lever where the disk is inserted or discharged, and the lever moves above the folded piece. With this aspect, it is possible to prevent the part from being influenced by the motion of the lever.

EMBODIMENT

A disk apparatus according to an embodiment of the present invention will be explained.

Figure 1:
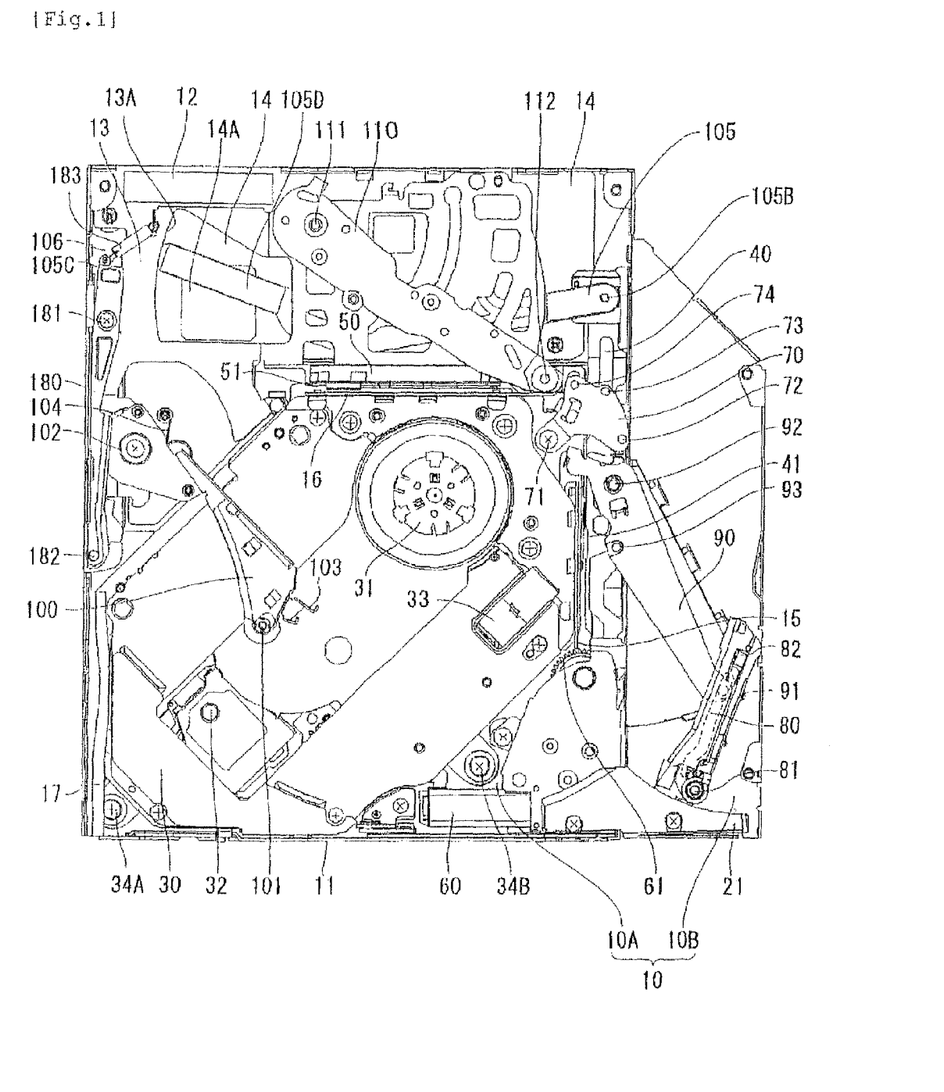
FIG. 1 is a schematic plan view of a base body of a disk apparatus according to an embodiment of the present invention.
Figure 2:
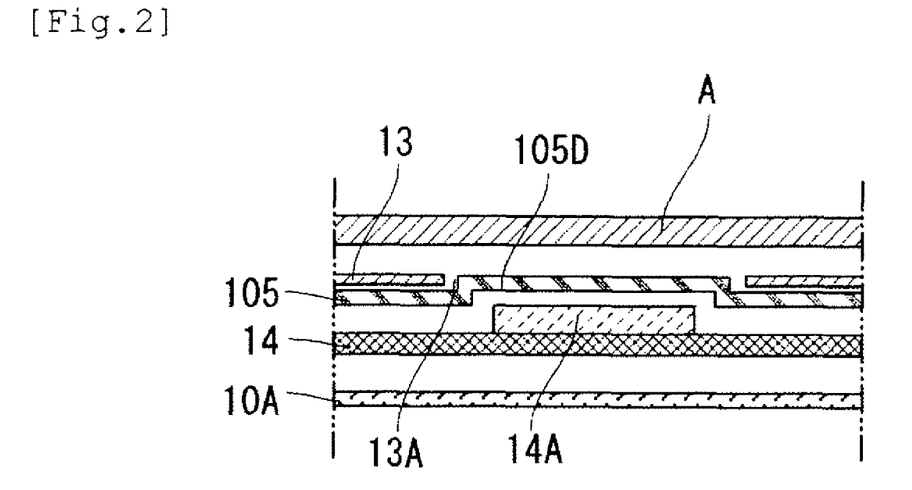
FIG. 2 is a sectional view of an essential portion of a rear base of the disk apparatus.

FIG. 1 is a plan view of abase body of the disk apparatus. FIG. 2 is a sectional view of an essential portion of the disk apparatus.

According to the disk apparatus of the embodiment, a base body and lid constitute a chassis sheath, and a bezel is attached to a front surface of the chassis sheath. The disk apparatus of the embodiment is a slot-in type disk apparatus in which a disk is directly inserted from a disk-insertion opening formed in the bezel.

As shown in FIG. 1, parts which realize the recording and replaying function onto or from a disk and a loading function of a disk are attached to the base body 10.

The base body 10 is formed with a deep bottom 10A and a shallow bottom 10B. A wing portion extending from a front surface to a rear surface is formed by the shallow bottom 10B.

The base body 10 is formed at its front side with a disk-insertion opening 11 into which a disk is directly inserted, and a connector 12 is disposed on an end of a rear surface of the base body 10. A traverse base 30 is disposed on the base body 10 on the side of the disk-insertion opening 11, and a rear base 13 is disposed on the base body 10 on the side of the connector 12. The traverse base 30 and the rear base 13 are disposed such that they are not superposed on each other. A printed board 14 is provided on the rear base 13 on the side of the surface of the base body 10.

An opening 13A is formed in a portion of the rear base 13, and a part 14A to be mounted on the printed board 14 is disposed such as to correspond to the opening 13A.

The traverse base 30 holds a spindle motor 31, a pickup 32 and driving means 33 which moves the pickup 32. The spindle motor 31 is provided on the one end side of the traverse base 30, and the pickup 32 is provided such that the pickup 32 can move from one end to the other end of the traverse base 30. When the pickup 32 is stopped, it is disposed on the side of the other end of the traverse base 30, i.e., on the outer peripheral side of the base body 10.

In the traverse base 30, the spindle motor 31 is located at a central portion of the base body 10, a reciprocating range of the pickup 32 is located closer to the disk-insertion opening 11 than the spindle motor 31, and the reciprocating direction of the pickup 32 is different from the insertion direction of the disk. Here, an angle of 45° is formed between the reciprocating direction of the pickup 32 and the insertion direction of a disk.

The traverse base 30 is supported on the base body 10 by a pair of insulators 34A and 34B.

The pair of insulators 34A and 34B are disposed closer to a stationary position of the pickup 32 than the position of the spindle motor 31. In this embodiment, the insulator 34A is provided on the side of one end near the inner side of the disk-insertion opening 11, and the insulator 34B is provided at a central portion near the inner side of the disk-insertion opening 11. The insulators 34A and 34B includes damper mechanisms made of elastic material. The traverse base 30 brings the spindle motor 31 toward the base body 10 and away from the base body 10 around the insulators 34A and 34B as fulcrums.

A main slider 40 and a sub-slider 50 and a sub-slider 50 having cam mechanisms will be explained below. The cam mechanisms which displace the traverse base 30 are respectively provided on the main slider 40 and the sub-slider 50. The main slider 40 and the sub-slider 50 are disposed on the side of the spindle motor 31. The main slider 40 is disposed such that its one end comes on the side of a front surface of the chassis body 10 and its other end comes on the side of a rear surface of the chassis body 10. The sub-slider 50 is disposed between the traverse base 30 and the rear base 13 in a direction perpendicular to the main slider 40.

The cam mechanisms which displace the traverse base 30 comprise a first cam mechanism 41 and a second cam mechanism 51. The first cam mechanism 41 is provided on a surface of the main slider 40 on the side of the spindle motor 31, and the second cam mechanism 51 is provided on the sub-slider 50 on the side of the spindle motor 31.

A base member 15 is provided between the main slider 40 and the traverse base 30. A base member 16 is provided between the sub-slider 50 and the traverse base 30. The base member 15 and the base member 16 are fixed to the base body 10. A position of a cam pin of the traverse base 30 is limited by a vertical groove formed in the base member 15, and a position of the cam pin of the traverse base 30 is limited by a vertical groove formed in the base member 16.

The base member 16 and the sub-slider 50 are connected to each other through a third cam mechanism (not shown). The third cam mechanism has a function for moving the sub-slider 50 away from the base body 10 when the traverse base 30 is moved away from the base body 10 by the second cam mechanism 51.

A loading motor 60 is disposed on the side of one end of the main slider 40. A drive shaft of the loading motor 60 and the one end of the main slider 40 are connected to each other through a gear mechanism 61.

By driving the loading motor 60, the main slider 40 can slide in the longitudinal direction. The main slider 40 is connected to the sub-slider 50 by a cam lever 70.

The cam lever 70 includes a turning fulcrum 71, a pin 72, a pin 73 and a pin 74. The pins 72 and 73 engage with a cam groove formed in an upper surface of the main slider 40, the pin 74 engages a cam groove formed in an upper surface of the sub-slider 50, and the cam lever 70 turns around a turning fulcrum 71 as an axis.

The above-explained connector 12, traverse base 30, rear base 13, printed board 14, insulators 34A and 34B, main slider 40, sub-slider 50 and loading motor 60 are provided on the deep bottom 10A of the base body 10, and form a disk inserting space between these members and the lid.

Next, a guide member for supporting a disk when the disk is to be inserted, and a lever member which operates when a disk is inserted will be explained below.

A first disk guide 17 having a predetermined length is provided on the side of one end of the deep bottom 10A near the disk-insertion opening 11. The first disk guide 17 has a groove having a U-shaped cross section as viewed from the disk inserting side. A disk is supported by this groove.

A pull-in lever 80 is provided on the shallow bottom 10B on the side of the disk-insertion opening 11. A second disk guide 81 is provided on a movable side end of the pull-in lever 80. The second disk guide 81 comprises a cylindrical roller, and is turnably provided on the movable end of the pull-in lever 80. A groove is formed in a roller outer periphery of the second disk guide 81, and a disk is supported by this groove.

The movable end of the pull-in lever 80 is operated closer to the disk-insertion opening 11 than the stationary side. The pull-in lever 80 has a turning fulcrum 82 on the stationary end.

The pull-in lever 80 is operated by a sub-lever 90.

The sub-lever 90 has a projection 91 on the movable side one end, and a turning fulcrum 92 on the other end. The projection 91 of the sub-lever 90 slides in a long groove in the pull-in lever 80. The turning fulcrum 92 of the sub-lever 90 is located on the main slider 40. The turning fulcrum 92 is not operated in association with the main slider 40, and is fixed to the base body 10. A pin 93 is provided on a lower surface of the sub-lever 90 at a location closer to the projection 91 than the turning fulcrum 92. The pin 93 slides in the cam groove formed in an upper surface of the main slider 40. Therefore, the angle of the sub-lever 90 is changed as the main slider 40 moves, and if the angle of the sub-lever 90 is changed, the turning angle of the pull-in lever 80 is changed. That is, the second disk guide 81 of the pull-in lever 80 moves toward and away from the spindle motor 31 by the operation of the sub-lever 90.

A discharge lever 100 is provided on a side of the base body 10 which is different from the pull-in lever 80. A guide 101 is provided on a movable side end on the side of one end of the discharge lever 100. A turning fulcrum 102 is provided on the other end of the discharge lever 100. An abutment portion 103 is provided on the movable side end of the discharge lever 100 on the side of a rear surface as compared with the guide 101. The discharge lever 100 is provided with an elastic body 104. One end of the elastic body 104 is fixed to the discharge lever 100, and the other end is fixed to the rear base 13. When the abutment portion 103 is pulled toward the rear surface by the elastic body 104, the abutment portion 103 abuts against an abutment portion 13A of the rear base 13. The discharge lever 100 is pulled out toward the disk-insertion opening 11 by elastic force of the elastic body 104. The discharge lever 100 is operated in association with the main slider 40 through a link arm 105 and a discharge slider 106. The link arm 105 is turnably provided on the rear base 13 by a shaft 105A. One end of the link arm 105 is connected to the main slider 40 through a pin 105B, and the other end is connected to the discharge slider 106 by a pin 105C. The discharge lever 100 engages with a cam groove formed in the discharge slider 106 by a cam pin.

A guide lever 180 is provided on a side of the base body 10 that is on the same side where the discharge lever 100 exists. A rear surface of the guide lever 180 is a turning fulcrum 181, and a movable side of the guide lever 180 has a guide 182. The guide lever 180 is biased by an elastic body 183 such that the side of the guide 182 projects toward a disk. The guide lever 180 is operated in associated with the main slider 40 through the link arm 105 and the discharge slider 106, and the side of the guide 182 is separated from a disk in accordance with motion of the main slider 40.

A restriction lever 110 is provided on the side of a rear surface of the base body 10. An end of the restriction lever 110 on the side of its rear surface is a turning fulcrum 111, and an end of the restriction lever 110 on the movable side has a guide 112. The side of the guide 112 of the restriction lever 110 is always biased such as to project toward the front side by an elastic body. The restriction lever 110 operates a limit switch at a predetermined position. That is, if a disk is inserted to a predetermined position, the limit switch is turned OFF, and the loading motor 60 is driven. If the loading motor 60 is driven, the main slider 40 slides.

The base body 10 is provided at its front side with a front guider 21. The front guider 21 is provided on the side of one end of the disk-insertion opening 11, and is disposed between the pull-in lever 80 and the disk-insertion opening 11. The front guider 21 is provided closer to the lid than the loading motor 60, the gear mechanism and the main slider 40 such as to cover portions of the loading motor 60, the gear mechanism and the main slider 40.

The operation of the cam lever will be explained below.

While the pin 73 is in engagement with the cam groove of the main slider 40, the cam lever 70 does not turn. This state is the standby state. This state continues for a while even after a disk is loaded, and the traverse base 30 is close to the base body 10.

The pin 73 comes out from the cam groove of the main slider 40 when the center of the disk comes above the spindle motor 31, and the cam lever 70 starts turning.

The main slider 40 has a groove in which the pin 72 of the cam lever 70 slides, and the first cam mechanism 41 is moved in the same direction as the main slider 40 by motion of the cam lever 70. If the cam lever 70 turns, the sub-slider 50 is moved, and if the sub-slider 50 is moved, the second cam mechanism 51 is operated.

That is, if the cam lever 70 turns, the first cam mechanism 41 and the second cam mechanism 51 are moved by predetermined distances, and the traverse base 30 is displaced.

When the chucking motion is completed, the turning motion of the cam lever 70 is completed.

Next, a structure of peripheries of the opening 13A of the rear base 13 will be explained using FIG. 2. FIG. 2 is a sectional view of an essential portion of the rear base of the embodiment.

As shown in FIG. 2, a portion of the link arm 105 is formed with a folded piece 105D which is folded toward the opening 13A. A space is formed on the side of the printed board 14 by this folded piece 105D, and the part 14A to be mounted on the printed board 14 is disposed such as to correspond to this space.

According to this embodiment, the thickness of the rear base 13 is sufficiently secured, a disposition space for the part 14A is secured by the space formed by the folded piece 105D, and the apparatus can be reduced in thickness.

FIGS. 3 to 8 are plan views showing motion states of the link arm caused by pulling-in motion of a disk.

Figure 3:
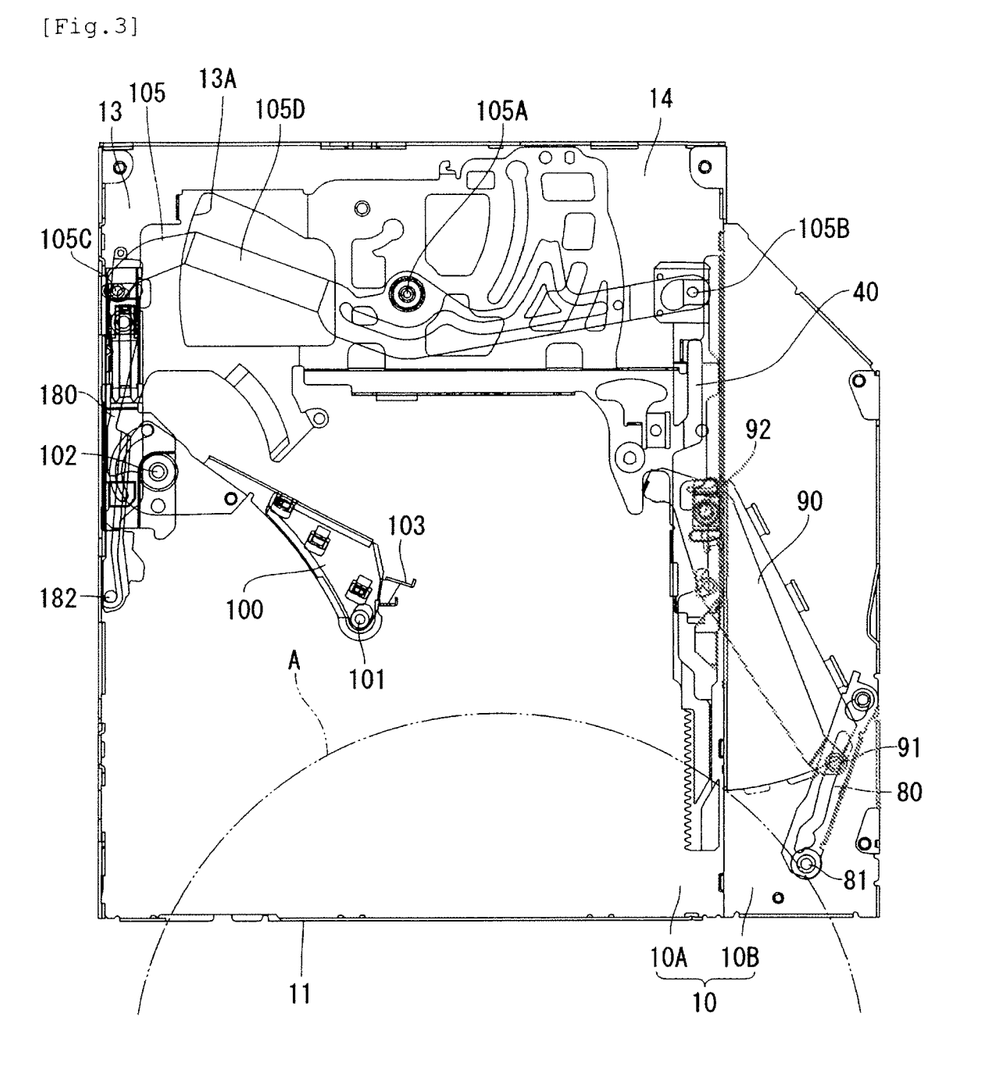
FIG. 3 is a plan view showing a motion state of a link arm of the disk apparatus.
Figure 4:
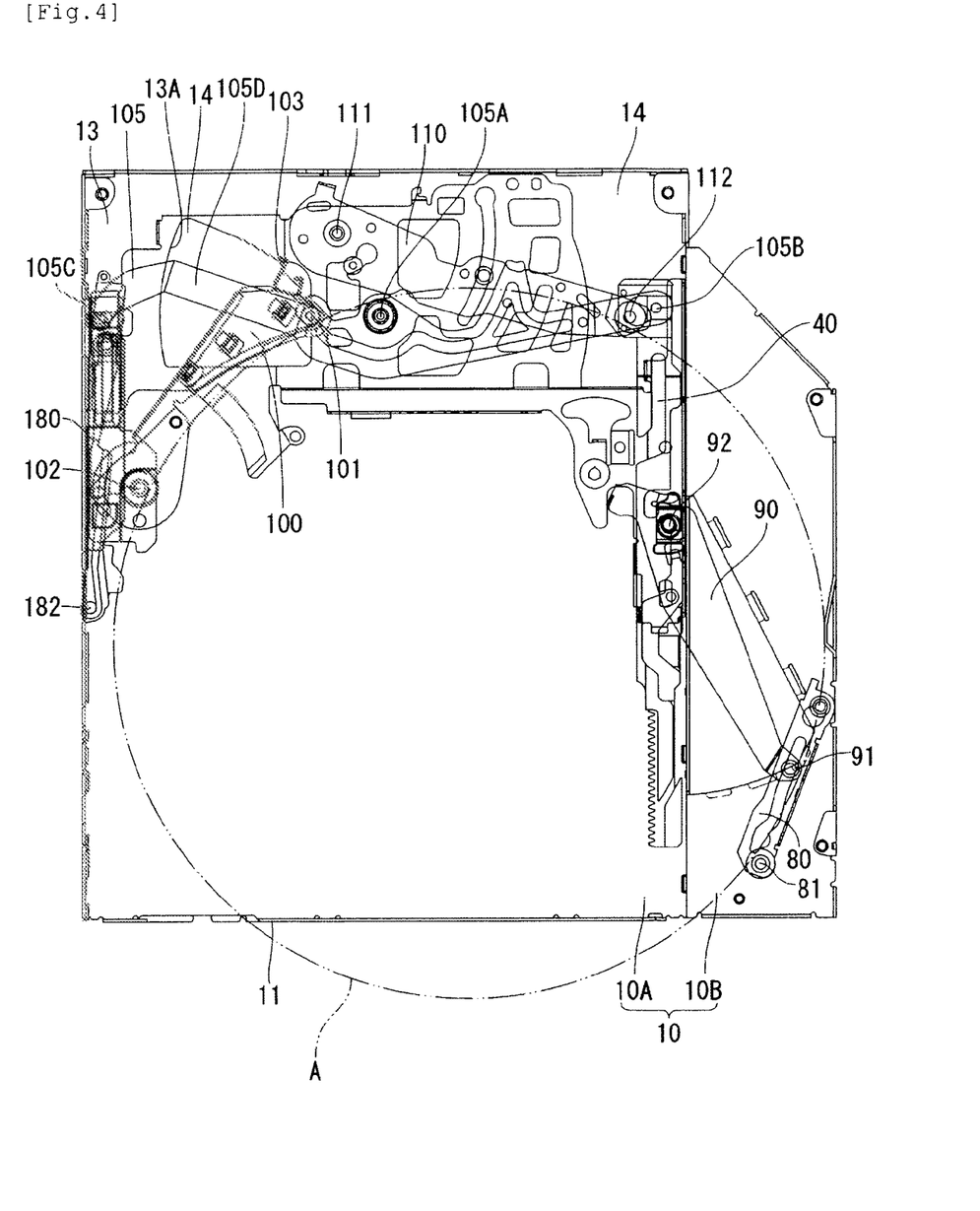
FIG. 4 is a plan view showing the motion state of the link arm of the disk apparatus.
Figure 5:
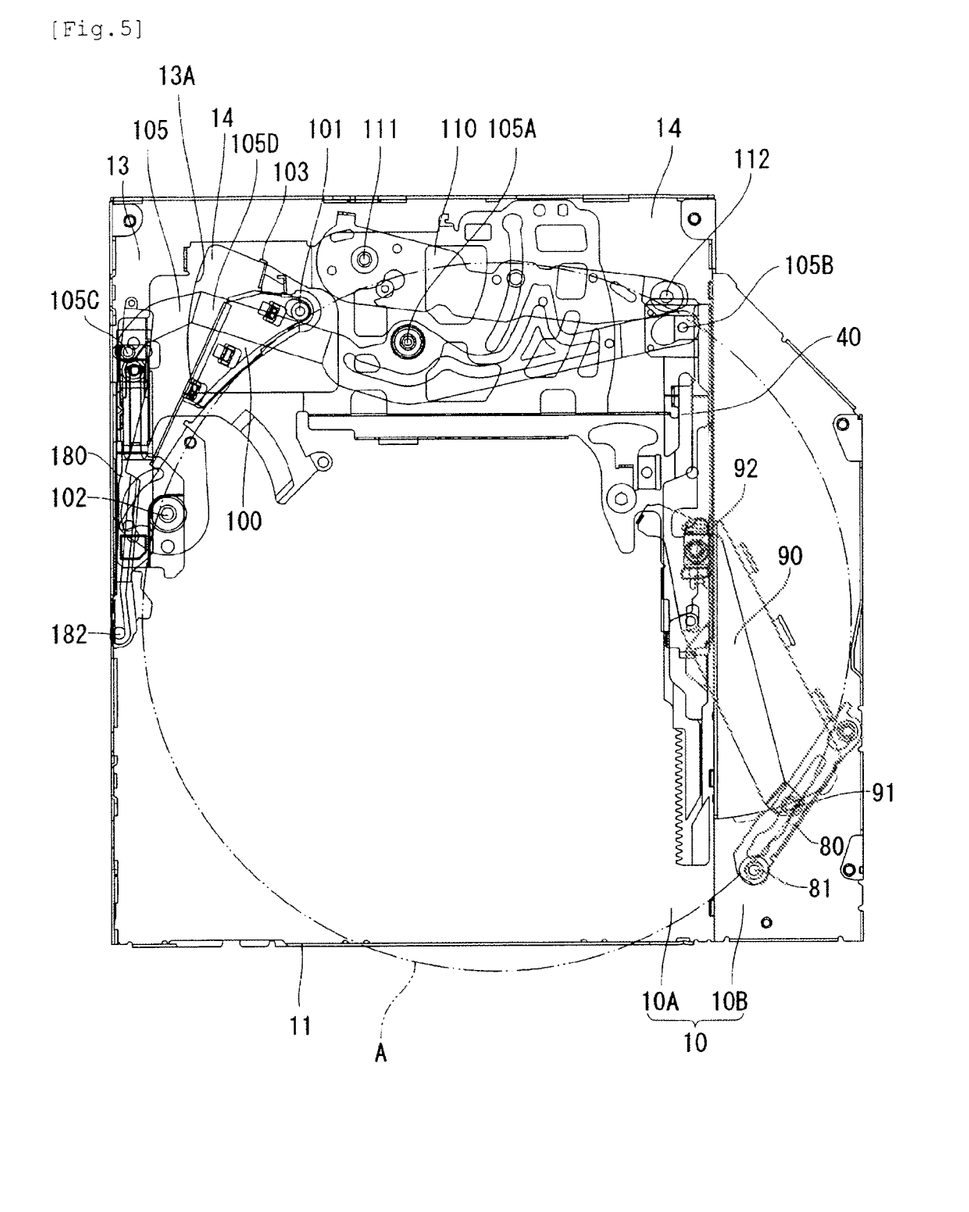
FIG. 5 is a plan view showing the motion state of the link arm of the disk apparatus.

FIGS. 3 to 5 shows variation in state where a disk A is pushed in by a force from outside. In the state shown in FIGS. 3 to 5, the link arm 105 is in a stationary state, and the folded piece 105D does not move.

When the state shown in FIG. 3 is shifted to a state shown in FIG. 4, the disk A abuts against the guide 101 of the discharge lever 100, and the discharge lever 100 is turned. When the discharge lever 100 passes above the opening 13A as shown in FIGS. 4 and 5, the discharge lever 100 moves above the folded piece 105D.

The insertion of the disk A is detected in a state shown in FIG. 5, and if the loading motor 60 is driven, the main slider 40 slides toward the rear surface.

Figure 6:
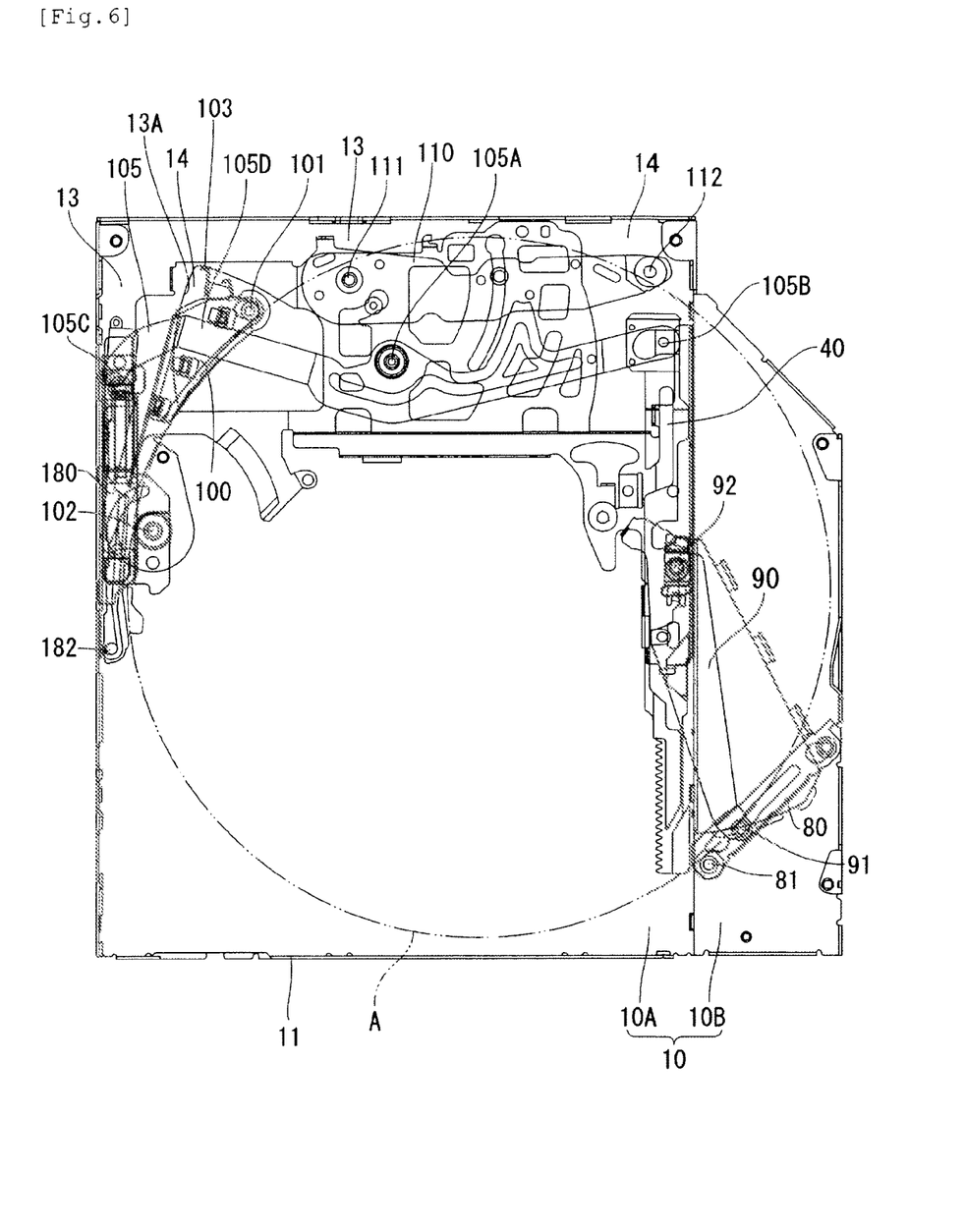
FIG. 6 is a plan view showing the motion state of the link arm of the disk apparatus.
Figure 7:
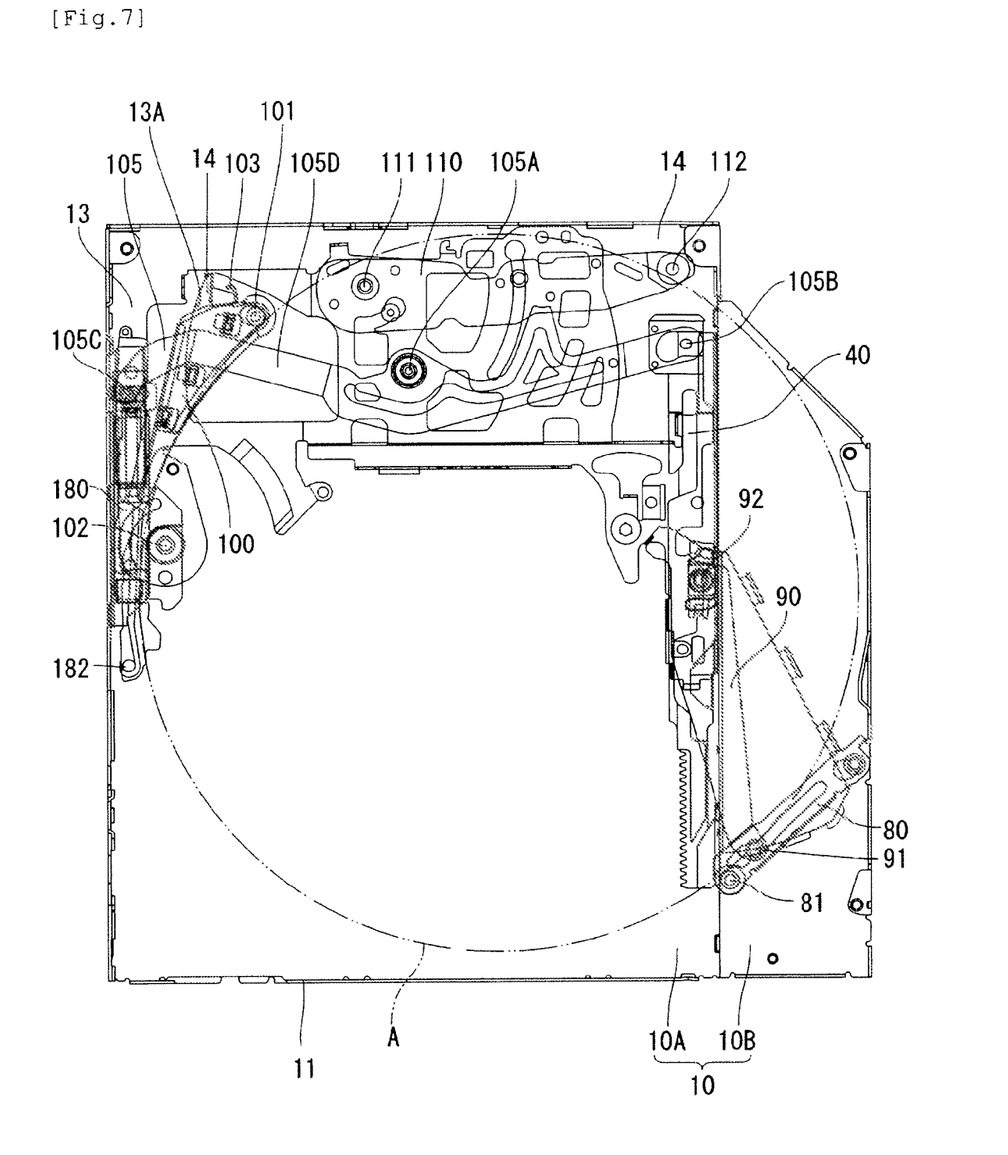
FIG. 7 is a plan view showing the motion state of the link arm of the disk apparatus.

If the main slider 40 slides, the link arm 105 turns around the shaft 105A as shown in FIGS. 6 and 7, the folded piece 105D moves in the opening 13A, and the discharge lever 100 moves above the folded piece 105D.

Figure 8:
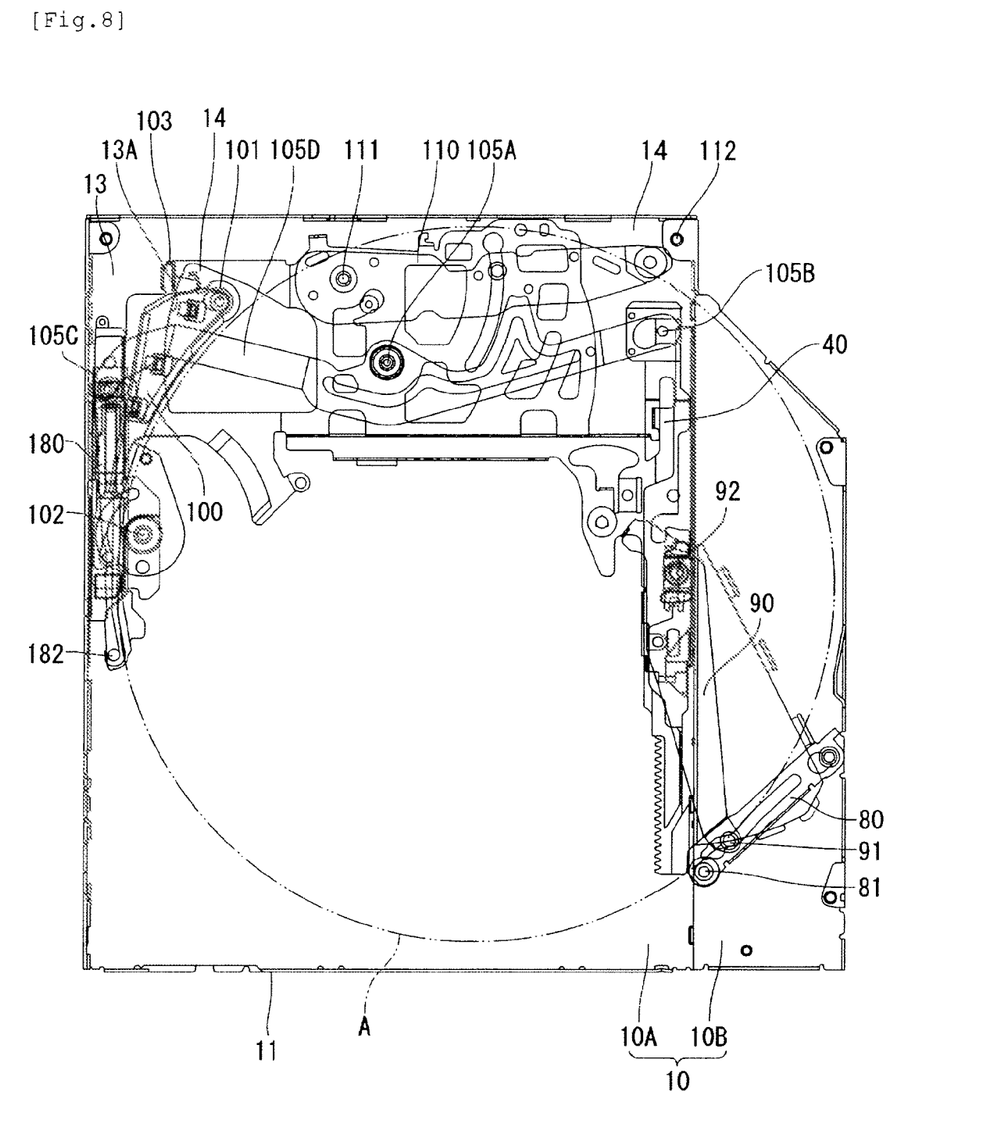
FIG. 8 is a plan view showing the motion state of the link arm of the disk apparatus.

FIG. 8 shows a state where the pull-in motion of the disk A is completed.

The motion of the link arm 105 is stopped in the state shown in FIG. 7, the discharge lever 100 is separated from the disk A, but the discharge lever 100 moves above the folded piece 105D at this time also.

According to the embodiment, even if the opening 13A is located within a moving range of the discharge lever 100 where the disk A is discharged, since the discharge lever 100 moves above the folded piece 105D, it is possible to prevent the part 14A from being influenced by the movement of the discharge lever 100.

In this embodiment, the case in which the opening 13A is located in the moving range of the discharge lever 100 where the disk is discharged is explained, but the opening 13A may be located in a moving range of the lever where the disk apparatus is inserted.

This application is based upon and claims the benefit of priority of Japanese Patent Application NO. 2006-23404 filed on Jan. 31, 2006, the contents of which are incorporated herein by reference in its entirety.

INDUSTRIAL APPLICABILITY

In a disk apparatus for recording or replaying into or from a disk-like recording medium such as a CD and a DVD, the present invention can be utilized for a disk apparatus which is used as a domestic video device or a peripheral device of a computer, and which needs to be reduced in thickness.

The invention claimed is:
1. A slot-in type disk apparatus, comprising:
a base body which constitutes a chassis sheath;

a disk-insertion opening that is configured to receive a disk directly inserted therein and that is formed in a front surface of the chassis sheath;

a traverse base disposed on a front surface side of the base body;

a rear base disposed on a rear surface side of the base body;

a printed board provided between the rear base and the base body; and a link arm disposed between the rear base and the printed board, wherein:

an opening is formed in a portion of the rear base, a folded piece which is folded toward the opening is formed on a portion of the link arm, a space is formed on the side of the printed board by the folded piece, a part mounted on the printed board is disposed such as to correspond to the space, the opening formed in the rear base is disposed in a moving range of a lever, and the folded piece is located in the opening.

2. The slot-in type disk apparatus according to claim 1, wherein the opening formed in the rear base is located in the moving range of the lever where the disk is inserted or discharged, and the lever is configured to move above the folded piece.

* * * * *